United States Patent [19]
Hinachi et al.

[11] 3,800,206
[45] Mar. 26, 1974

[54] STEPPING MOTOR DRIVE CONTROL SYSTEM WITH COIL CURRENT ADJUSTMENT

[75] Inventors: Matatoyo Hinachi, Nagoya; Toyoshi Mori, Gifu, both of Japan

[73] Assignee: Kabushiki Kaisha Tokai Rika Denki Seisakusho, Aichi Prefecture, Japan

[22] Filed: Sept. 8, 1971

[21] Appl. No.: 178,730

[30] Foreign Application Priority Data
  Sept. 9, 1970  Japan............................. 45-78639

[52] U.S. Cl................... 318/696, 318/138, 318/440
[51] Int. Cl. ..................................... H02k 37/00
[58] Field of Search .......... 318/696, 685, 138, 254, 318/440; 310/163, 162, 49

[56] References Cited
UNITED STATES PATENTS

| | | | |
|---|---|---|---|
| 3,626,269 | 12/1971 | Stanley | 318/696 |
| 2,548,633 | 4/1951 | Stephenson | 310/163 |
| 3,206,623 | 4/1965 | Snowdon | 318/696 |
| 3,327,191 | 6/1967 | Goto | 318/696 |
| 3,445,741 | 5/1969 | Gerber | 318/696 |
| 3,355,646 | 11/1967 | Goto | 318/685 |
| 3,239,738 | 3/1966 | Welch | 310/49 |
| 3,250,977 | 5/1966 | Heggen | 310/696 |
| 3,386,018 | 5/1968 | Smith-Vaniz | 318/696 |
| 3,445,741 | 5/1969 | Gerber | 318/696 |
| 3,621,358 | 11/1971 | Hinrichs | 318/696 |

*Primary Examiner*—G. R. Simmons
*Attorney, Agent, or Firm*—Woodhams, Blanchard and Flynn

[57] ABSTRACT

Drive control system for a 4-phase stepping motor which is rotated by attraction and repulsion actions between permanent magnets and pole pieces thereof, the pole prices being provided with exciting coils. A rotor step angle per input pulse is reduced to one half of that obtainable in the prior art step motor drive system by alternately energizing one coil and a pair of coils. With such a drive control system ununiformity of torque characteristic which is inherent to a system alternately energizing one coil and a pair of coils is avoided by increasing exciting current during a time when one phase coil alone is excited to be larger than exciting current per phase during a time when two phase coils are excited.

11 Claims, 14 Drawing Figures

| Ia / Output | 0 | 1 | 0 | 1 | 0 | 1 | 0 | 1 | 0 | 1 |
|---|---|---|---|---|---|---|---|---|---|---|
| $O_1$ | 0 | 0 | 0 | 1 | 0 | 0 | 0 | 1 | 0 | 0 |
| $O_2$ | 0 | 1 | 0 | 0 | 0 | 1 | 0 | 0 | 0 | 1 |
| $O_3$ | 0 | 1 | 1 | 0 | 0 | 1 | 1 | 0 | 0 | 1 |
| $O_4$ | 1 | 0 | 0 | 1 | 1 | 0 | 0 | 1 | 1 | 0 |
| $O_5$ | 1 | 0 | 0 | 0 | 1 | 0 | 0 | 0 | 1 | 0 |
| $O_6$ | 0 | 0 | 1 | 0 | 0 | 0 | 1 | 0 | 0 | 0 |
| $O_7$ | 1 | 1 | 0 | 0 | 1 | 1 | 0 | 0 | 1 | 1 |
| $O_8$ | 0 | 0 | 1 | 1 | 0 | 0 | 1 | 1 | 0 | 0 |
| $O_N$ | 1 | 0 | 1 | 0 | 1 | 0 | 1 | 0 | 1 | 0 |

STEPPING MOTOR DRIVE CONTROL SYSTEM WITH COIL CURRENT ADJUSTMENT

The present invention relates to a drive control system for a 4-phase stepping motor which is rotated by attraction and repulsion actions between pole pieces and permanent magnets, and more particularly to a drive control system for a stepping motor wherein a stator or a rotor is provided with a plurality of exciting windings (also referred to as exciting coils), and attraction and repulsion actions between the pole pieces and permanent magnets resulting from sequential make and break operation of exciting currents flowing through the exciting windings due to input pulses are utilized to rotate the rotor in a sequential stepping manner by an angle corresponding to the number of the input pulses applied.

The invention will now be further described, by way of example, with reference to the accompanying drawings, in which.

Figure 10A:
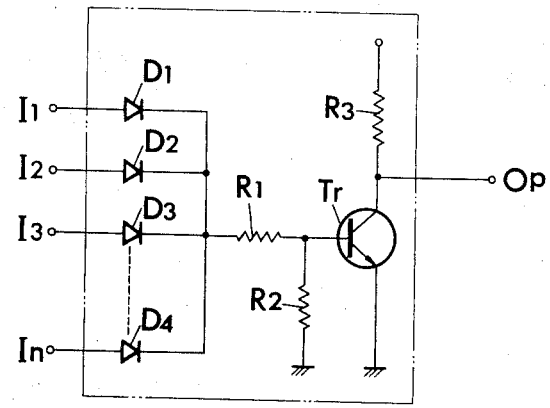
FIG. 10a is a diagram of a NOR gate.
Figure 10B:
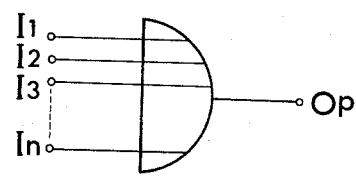
Figure 11:
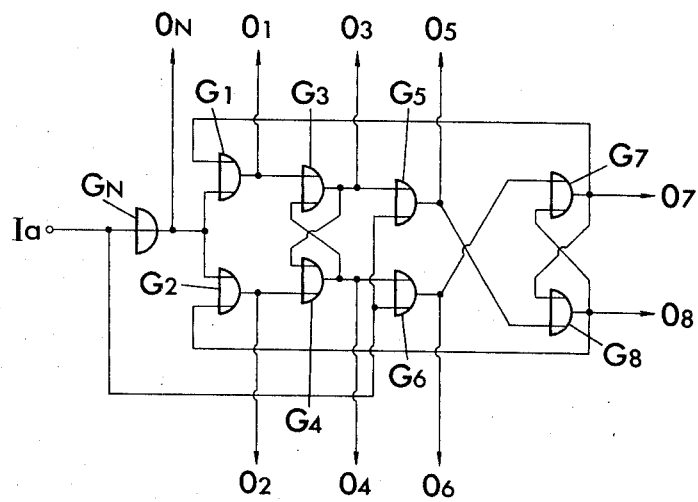
Figure 12:
Figure 13:
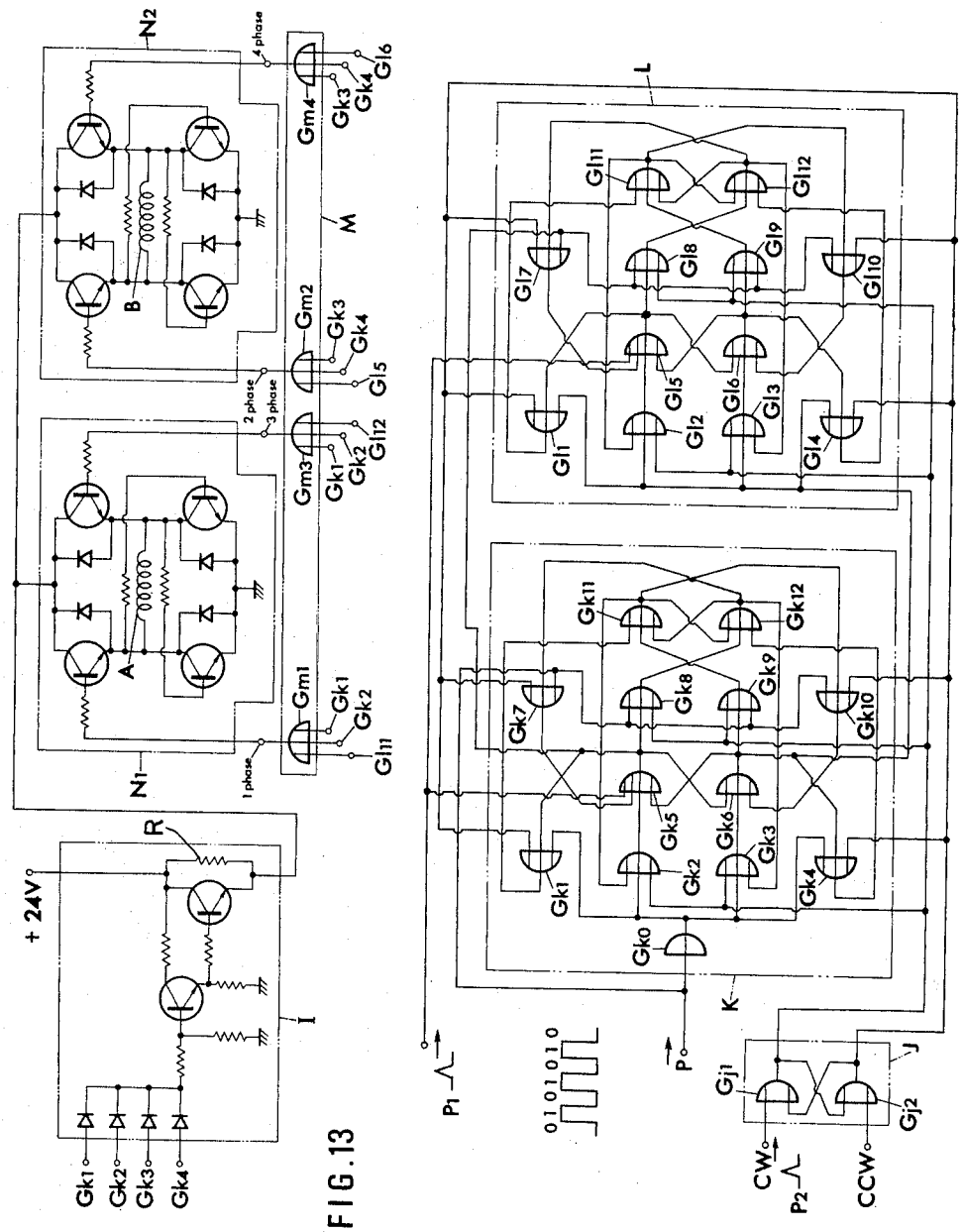

FG. 10b shows a symbol of the NOR GATE:

FIG. 11 is a diagram of a binary flip-flop represented by the symbol of FIG. 10b;

FIG. 12 shows a chart illustrating an operation of the binary flip-flop circuit; and FIG. 13 shows a circuit diagram of a stepping motor drive control system embodying the present invention.

For purposes of convenient reference, certain terminology is used in the following description. The terms "1-phase," "2-phase," "3-phase" and "4-phase" refer to the four different states of excitation of a stepping motor in connection with which the present invention is illustrated, for example, respectively, wherein (1) one exciting coil of the stepping motor is energized to magnetize its pole pieces with one magnetic polarity, (2) another exciting coil of the stepping motor is energized to magnetize its pole pieces with one magnetic polarity, (3) the one coil magnetizes its pole pieces with the opposite polarity, and (4) the other coil magnetizes its pole pieces with the opposite polarity. The terms phase 1, phase 2, etc., respectively, and the terms first phase-coil state," "second phase-coil state," etc., respectively, are used interchangeably with such terms 1-phase, 2-phase, etc. The stepping motor in connection with which the present invention is illustrated is thus referred to as a 4-phase stepping motor. The terms "1-exciting state" and "2-exciting state" refer, respectively, to operating conditions wherein (1) only one exciting coil of such stepping motor is energized and (2) both exciting coils of such stepping motor are energized. The terms "single excitation" and "double excitation," respectively, are similarly used.

Figure 1:
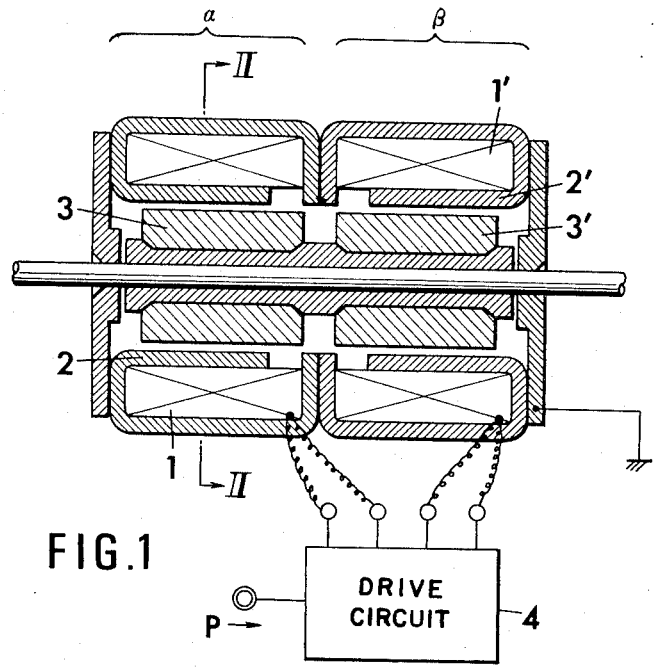
FIG. 1 is a longitudinal sectional view of a stepping motor which is rotated by attraction and repulsion actions between pole pieces and permanent magnets.
Figure 2:
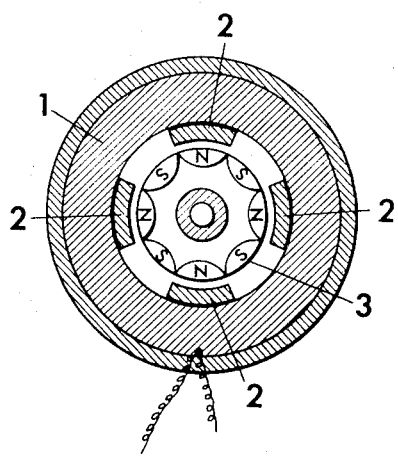
FIG. 2 is a cross-sectional view, taken along line II — II of FIG. 1.
Figure 3:
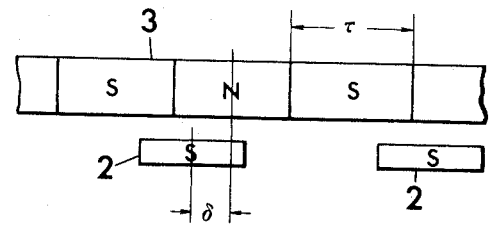
FIG. 3 is a developed view showing the relation between the permanent magnet and the pole pieces.

A 4-phase stepping motor, more particularly a twin stepping motor, which is rotated by attraction and repulsion actions between pole pieces and permanent magnets is constructed as shown in FIGS. 1 and 2. It consists of a motor block $\alpha$ comprising pole pieces 2 to be magnetized to N-pole or S-pole by a current flowing through an exciting coil 1 and permanent magnets 3 having alternate N- and S-poles around its periphery, and a motor block $\beta$ comprising pole pieces 2' to be magnetized to N-pole or S-pole by a current flowing through an exciting coil 1' and permanent magnets 3' having alternate N- and S-poles around its periphery, said motor blocks $\alpha$ and $\beta$ being coupled to each other offsetting by an electrical angle of 90°. In operation, in case to the exciting coil 1 is applied a current to magnetize the pole piece 2 to S-pole from a drive circuit 4, a deviation angle $\delta$ between a center line of an N-pole of the permanent magnet 3 having a pole pitch angle of $\tau$ and a center line of a pole piece 2 magnetized to S-pole will vary, and a torque T$\alpha$ (FIG. 4), whose amplitude S (FIG. 4) is substantially proportional to the amount of the exciting current, is applied to the rotor. One example of a 4-phase drive control system widely used in the prior art as a simple and inexpensive drive control system for the stepping motor of the structure as mentioned above, causes the rotors to sequentially step to the relative positions shown in FIG. 6 in accordance with the exciting sequence shown in FIG. 5. Stated illustratively, an exciting current $d_1'$ for magnetizing the pole pieces 2 of the motor block $\alpha$ in FIG. 1 to N-pole and an exciting current $d_4'$ for magnetizing the pole pieces 2' of the motor block $\beta$ in FIG. 1 to S-pole are directed, while an exciting current $d_3'$ for magnetizing the pole pieces 2 of the motor block $\alpha$ in FIG. 1 to S-pole and an exciting current $d_2'$ for magnetizing the pole pieces 2' of the motor block $\beta$ in FIG. 1 to N-pole are cut off, to wit, phase 1 and phase 4 of the stepping motor are excited. The rotors are then stopped at relative halt locations as shown in (i) of FIG. 6 wherein a circumferential attraction force (an arrow $a$) between the permanent magnets 3 and the pole pieces 2 is balanced with a circumferential attraction force (an arrow $b$) between the permanent magnets 3' and the pole pieces 2'.

Figure 5:
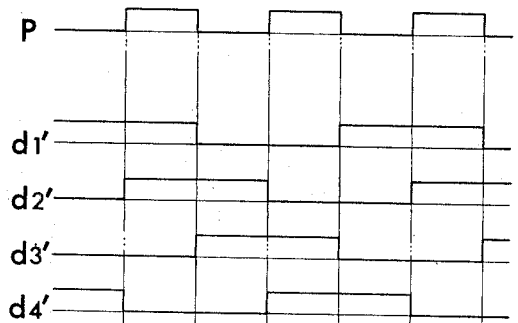
FIG. 5 illustrates a sequence of an exciting operation in accordance with prior art drive control system.
Figure 6:
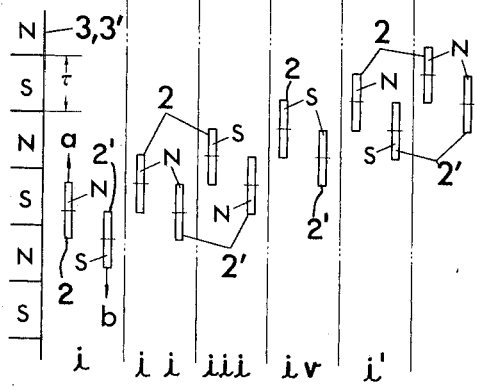
FIG. 6 is a diagrammatical view of relative positions of the rotors stopped under the respectively corresponding conditions shown in FIG. 5.

Then, if the input pulse P (FIG. 1 and 5) is varied, the drive circuit flows the current $d_2'$ instead of the current $d_4'$, or phase 1 and phase 2 are excited in accordance with the predetermined operational sequence, the rotors will be stopped at a relative halt locations (ii) of FIG. 6. Said relative halt locations are in advance of the relative halt location (i) of FIG. 6, by $\tau/2$ pitch. Further steps in such sequence are shown in FIG. 6 at iii and iv, with the sequence restarting at i'. The on, off conditions of the exciting currents $d_1'$ through $d_4'$ for such further steps is indicated in corresponding FIG. 5. Thus, this prior art system may be characterized as a 2-excitation (double excitation) system in that each motor stepping increment is the result of contemporaneous energization of both coils 1 and 1'. In the system described above, the torque for casuing the rotors to move to and stop at respective relative halt locations is a sum of a torque $T\alpha$ of FIG. 7, caused by the motor block $\alpha$ and a torque $T\beta$ caused by the motor block $\beta$, namely, a torque $T_E$ having an amplitude S'. The $\delta$ depicts a deviation angle of the rotors from respective relative halt locations.

In such a prior art drive control system, however, a step angle per input pulse is a half of the pole pitch angle $\tau$ of the pole pieces magnetized by the permanent magnets 3, 3'. Accordingly, if the width of the pole pieces is increased for the purpose of increasing the magnetization of the permanent magnets 3, 3' to ensure torque characteristic, undesired increase of the step angle is then increased. For this reason, it has been impossible, heretofore, to impart the stepping motor a sufficient self-exciting frequency characteristic, a sufficient unti-haunting, a sufficient torque characteristic and etc.

The present invention is achieved to resolve the above difficulties, and it is an object of the present invention to provide a novel and improved stepping motor drive control system for a 4-phase stepping motor adapted to rotate by attraction and repulsion actions of the permanent magnets, wherein a double excitation (2-excitation) and a single excitation (1-excitation) are alternately excited and a uniform torque characteristic is imparted to the motor over the entire excitation.

In accordance with the present invention, there is provided, in a 4-phase stepping motor comprising pole pieces and permanent magnets provided with stepping motor exciting coils and adapted to be rotated by attraction and repulsion actions between said permanent magnets and pole pieces, a drive control system characterized in that 2-excitation and 1-excitation status are alternately employed and that an amount of a current flowing through the stepping motor exciting coils during the 1-excitation state is kept to be larger than that of a current flowing through one of the stepping motor exciting coils during the 2-excitation state.

Prior to describing one embodiment of the present invention with reference to FIG. 13, a brief explanation will be given, for easier understanding of the present invention, regarding to a well-known NOR gate and binary flip-flop circuit with reference to FIGS. 10 to 12. In FIG. 10a, characters $I_1, I_2, I_3 - I_n$ represent input terminals of the NOR gate, character $O_p$ represents an output terminal, $D_1, D_2, D_3 - D_n$ represent diodes, $R_1, R_2, R_3$ represent resistors and $T_r$ represents a transistor. Said NOR gate is composed of said diodes, resistors and transistor. When a positive voltage signal is applied to any one of the input terminals $I_1, I_2, I_3 - I_n$, for example, when such a signal is applied to the terminal $I_1$, the transistor $T_r$ draws a base current through the diode $D_1$ and the resistor $R_1$, rendering the transistor $T_r$ conductive (ON) and in turn, a potential at the output terminal $O_p$ to zero. (This status is hereinafter referred to as "0").

When the positive voltage signal is not applied to any one of the input terminals $I_1, I_2, I_3 - I_n$, the transistor $T_r$ remains in its OFF condition and a predetermined voltage will appear at the output terminal $O_p$. (This status is hereinafter referred to as "1.") The NOR gate described above is represented symbolically in FIG. 10b, and such a symbol is utilized to arrange a circuit to be described below.

Referring now to FIG. 11 and 12, there is illustrated a binary flip-flop circuit which constitutes a major part of FIG. 13 which is one embodiment of the present invention. The binary flip-flop circuit comprises a flip-flop circuit including gates $G_3, G_4$, a flip-flop circuit including gates $G_7, G_8$, gates $G_1$ and $G_2$ connected between the flip-flop circuit of $G_3, G_4$ and the flip-flop circuit of $G_7, G_8$ for presenting the negation of the output of the gate $G_7$ to the input terminal of the gate $G_3$ and the negation of the output of the gate $G_8$ to the input terminal of the gate $G_4$ when the input terminal $I_a$ is in the 1 state, while interrupting the outputs of the gates $G_7$ and $G_8$ to present 0 to the input terminals of the gates $G_3$ and $G_4$ when the input terminal $I_a$ is in the 0 state, gate $G_5$ and $G_6$ for presenting the negation of the output of the gate $G_3$ to the input terminal of the gate $G_8$ and the negation of the output of the gate $G_4$ to the input terminal of the gate $G_7$ when the input terminal $I_a$ is in the 0 state while interrupting the output of the gates $G_3$ and $G_4$ to present 0 to the input terminal of the gates $G_3$ and $G_4$ when the input terminal $I_a$ is in the 1 state, and a negation gate (NOT gate) $G_n$ for presenting the negation of the input terminal $I_a$ to the gates $G_1$ and $G_2$.

The operation of the above circuit is now described. Assuming that the output terminal $O_3$ of the gate $G_3$ is "O" and the output terminal $O_4$ of the gate $G_4$ is 1, then the output terminals $O_n, O_1, O_2, O_5, O_6, O_7$ and $O_8$ of the gates $G_n, G_1, G_2, G_5, G_6, G_7$ and $G_8$ are in the state as shown in the first row of the chart of FIG. 12, when the input terminal $I_a$ is 0. That is, since the input terminal $I_a$ is 0, the output terminal $O_n$ of the gate $G_n$ presents 1. On the other hand, since the input of the gate $G_5$ receives 0 at the input terminal $I_a$ and 0 at the output of the gate $G_3$, its output exhibits 1. Similarly, since the input of the gate $G_6$ receives 0 at the input terminal $I_a$ and 1 at the output of the gate $G_4$, its output exhibits 0. The gate $G_7$ receives at its input 0 of the gate $G_6$ and the output of the gate $G_8$ to the input of which is applied 1 at the output of the gate $G_5$. Therefore, the output of the gate $G_8$ is 0, whether another input signal may be 0 or 1. Since the 0 of the gate $G_6$ and the 0 of the gate $G_8$ are thus applied to the input of the gate $G_7$, the output of the gate $G_7$ is 1. Moreover, since the inputs of the gates $G_1$ and $G_2$ receive 1 at the output of the gate $G_n$, the outputs of the gate $G_1$ and $G_2$ and 0 irrespective of the outputs of the gate $G_7$ and $G_8$.

In a similar manner as described above, it will be understood that when the input terminal $I_a$ is in the 1 state, the outputs as shown in the second row of the chart of FIG. 12 appear on each of the gates. The operation proceeds to the forth row in the same manner and then it repeats the operation from the first to the fourth row of the chart.

One embodiment of the present invention will now be described with reference to a circuit diagram shown in FIG. 13. Character K designates a reversible binary flip-flop circuit in which when a forward rotation command trigger pulse $P_2$ is applied to an input terminal CW, a gate $Gj_1$ will become 0 state while a gate $Gj_2$ will become 1 state, thus causing gates $Gk_1, Gk_4, Gk_7$ and $Gk_{10}$ to exhibit "0" state to serve as a forward binary flip-flop circuit composed of gates $Gk_0, Gk_2, Gk_3, Gk_5, Gk_6, Gk_8, Gk_9, Gk_{11}$ and $Gk_{12}$. On the other hand, when a reverse rotation command trigger pulse $P_2$ is applied to an input terminal CCW, the gate $Gj_1$ will become 1 state while the gate $Gj_2$ will become 0 state, causing the gates $Gk_2$, $Gk_3$, $Gk_8$ and $Gk_9$ to exhibit 0 state to serve as a reverse binary flip-flop composed of the gates $Gk_0$, $Gk_1$, $Gk_4$, $Gk_5$, $Gk_6$, $Gk_7$, $Gk_{10}$, $Gk_{11}$ and $Gk_{12}$.

Character L designate a reversible binary flip-flop circuit in which its logic is stepped depending upon the output of said gates $Gk_5$ and $Gk_6$ of the flip-flop circuit K. When the forward rotation command trigger pulse $P_2$ is applied to the input terminal CW, the gate $Gj_1$ will be come 0 state while the gate $Gj_2$ will become 1 state, causing gates $Gl_1$, $Gl_4$, $Gl_7$, $Gl_{10}$ to take "0" state to operate as a forward binary flip-flop circuit composed of gates $Gl_2$, $Gl_3$, $Gl_5$, $Gl_6$, $Gl_8$, $Gl_9$, $Gl_{11}$ and $Gl_{12}$. On the other hand, when the reverse rotation command trigger pulse $P_2$ is applied to the input terminal CCW, the gate $Gj_1$ will become 1 state while the gate $Gj_2$ will become 0 state, causing the gate $Gl_2$, $Gl_3$, $Gl_8$ and $Gl_9$ to take 0 state to operate as a reverse binary flip-flop circuit composed of gates $Gl_1$, $Gl_4$, $Gl_5$, $Gl_6$, $Gl_7$, $Gl_{10}$, $Gl_{11}$ and $Gl_{12}$.

Character M designates a group of output gates for motor coil excitation which is composed of a gate $Gm_1$ having the outputs of said gates $Gk_1$, $Gk_2$ and $Gl_{11}$ applied as inputs thereto, a gate $Gm_3$ having the outputs of said gaktes $Gk_1$, $Gk_1$ and $Gl_{12}$ applied as inputs thereto, a gate $Gm_2$ having the outputs of said gates $Gk_3$, $Gk_4$ and $Gl_5$ applied as inputs thereto, and an gate $Gm_4$ having the outputs of said gates $Gk_3$, $Gk_4$ and $Gl_6$ applied as inputs thereto.

Character I designates a current multiply circuit including four diodes and two transistors. When any one of the outputs of said gates $Gk_1$, $Gk_2$, $Gk_3$ and $Gk_4$ is 1, a current subtraction circuit (here a resistor R) is short-circuited, i.e. the two transistors of the current multiply circuits I are turned ON to increase the current flowing through an exciting coil A or B of the stepping motor (the coils A AND B being respectively, and for example, the exciting coils 1 and 1' of the motor of FIG. 1).

Characters $N_1$ and $N_2$ designate power amplifier circuits each comprising four transistors and four diodes. Each amplifier circuit is adapted to flow a current through the respective exciting coil A or B of the stepping motor in a predetermined direction, depending upon the output status of said coil exciting output gates $Gm_1$, $Gm_2$, $Gm_3$ and $Gm_4$.

Numeral J designates a command circuit for switching the direction of rotation. When the forward rotation command trigger pulse $P_2$ is applied to the input terminal CW, the gate $Gj_1$ will become 0 while the gate $Gj_2$ will become 1. On the other hand, when the reverse rotation command trigger pulse $P_2$ is applied to the input terminal CCW, the gate $Gj_1$ will become 1 while the gate $Gj_2$ will become 0. Thus, the command circuit J inverts the direction of the logic steps for the reversible binary flip-flop circuits K and L to instruct the direction of rotation of the stepping motor.

Operation of the circuit described above will now be explained. When power is applied to all of the circuits, 15 the input pulse P is in "0" state, the reset pulse $P_1$ is applied and the forward rotation command trigger pulse $P_2$ is applied to the input terminal CW, then the outputs of the gates $Gk_1$ and $Gk_4$ become "0" because the output of the gate $Gj_2$ remains "1" regardless of the state of the input pulse P and the output of the gate $Gk_5$ becomes 0 because the reset pulse $P_1$ has been applied.

As a consequence, the output of the gate $Gk_6$ becomes 0. On the other hand, the output of the gate $Gl_5$ also becomes 0 because the reset pulse $P_1$ has been applied, causing the output of the gate $Gl_6$ to become 1. Further, the output of the gate $Gl_{12}$ becomes 0 due to the output of the gate $Gl_5$ and the output of the $Gl_{11}$ becomes 1 due to the output of the gate $Gl_6$. Since the outputs of the gates $Gk_1$, $Gk_2$, $Gk_3$ and $Gk_4$ are all 0, currents flowing through the exciting coils A and B of the stepping motor decrease because the transistors of the current multiplying circuit I are in their OFF state. Thus, the output of the 1-phase exciting output gate $Gm_1$ is 0, the output of the 3-phase exciting output gate $Gm_3$ is 1, the output of the 2-phase exciting output gate $Gm_2$ is 1, and the output of the 4-phase exciting output gate $Gm_4$ is 0, thus causing decreased current 2-exciting state in which excited the 2-phase and the 3-phase.

When the input pulse P becomes 1, the output of the gate $Gk_2$ remains 0 in accordance with the operation of the binary flip-flop circuit explained in connection with FIG. 11, and the output of the gate $Gk_3$ changes to 1. The output of the gate $Gk_5$ changes to 1 while the output of the gate $Gk_6$ changes to 0, by which the output of the gate $Gl_5$ changes to 1 and the output of the gate $Gl_6$ changes to 0, but the output of the gate $Gl_{11}$ remains 1 and the output of the gate $Gl_{12}$ remains 0. Thus, the output of the 1phase exciting output gate $Gm_1$ is 0, the output of the 3-phase exciting output gate $Gm_3$ is "1", the output of the 2-phase exciting output gate $Gm_2$ is 0 and the output of the 4-phase exciting output gate $Gm_4$ is 0. Accordingly, the transistors in the current multiplying circuit I becomes ON due to the 1 output of the gate $Gk_3$, and the current continuously flowing through the motor exciting coil A is increased because of the 1 output of the 3-phase exciting output gate $Gm_3$, causing 1-exciting increased current state under which the 3-phase is excited.

If the input pulse P is changed to O, the output of the gate $Gk_3$ is reset to 0 while the output of the gate $Gk_2$ remains 0. Since the outputs of the gates $Gk_5$ and $Gk_6$ are not changed, the output of the gates $Gl_5$ and $Gl_6$ and the gates $Gl_{11}$ and $Gl_{12}$ are not changed, thus rendering the output of the 4-phase exciting output gate $Gm_4$ to 1. Furthermore, since the outputs of the gates $Gk_1$, $Gk_2$, $Gk_3$ and $Gk_4$ are all 0, the transistors of the current multiplying circuit I become OFF causing the decreased current state. That is, the 2-exciting decreased current state is provided, under which the 3-phase and the 4-phase are excited.

When the input pulse P is again changed to 1, the output of the gate $Gk_3$ remains 0 while the output of the gate $Gk_2$ is changed to 1. Thus, the output of the gate $Gk_5$ switches to 0 and the output of the gate $Gk_6$ switches to 1. By the "0" output of the gate $Gk_5$, the output of the gate $Gl_{11}$ switches to 0 and the output of the gate $Gl_{12}$ switches to 1 while the output of the gate $Gl_5$ remains 1 and the output of the gate $Gl_6$ remains 0. Thus, the outputs of the 1-phase, 2-phase and 3-phase exciting output gates $Gm_1$, $Gm_2$ and $Gm_3$ are all 0 while the output of the 4-phase exciting output gate $Gm_4$ is 1. Since the output of the gate $Gk_2$ is 1, the transistors in the current multiplying circuit I become ON, creating the increased current state. That is, 1-exciting increased current state is created, under which the 4-phase is excited.

When the input pulse P is again changed to 0, the output of the gate $Gk_2$ is reset to 0 while the output of the gate $Gk_3$ remains 0, and the outputs of the gates $Gk_5$ and $Gk_6$ are not changed. Thus, the outputs of the gates $Gl_5$, $Gl_6$ and $Gl_{11}$, $Gl_{12}$ are not changed, causing the output of the 1-phase exciting output gate $Gm_1$ to take 1 state. Furthermore, since the outputs of the gates $Gk_1$, $Gk_2$, $Gk_3$ and $Gk_4$ are all 0, the transistors of the current multiplying circuit I become OFF, creating the decreased current state. That is, the 2-exciting decreased current state is created, under which the 4-phase and the 1-phase are excited.

In a similar way, in response to the change of the input pulse P, two adjacent phases are brought into the exciting state and upon the next input pulse P one phase of said two phases remains to be excited with the amount of the exciting current being increased above the exciting current per phase in the 2-phase exciting state, creating the 1-exciting increased current state. Upon receipt of further input pulse P, the amount of the exciting current for said one phase is decreased and at the same time the excitation of the next phase is initiated, creating the 2-exciting decrease current state. The sequence is repeated thereafter.

Figure 8:
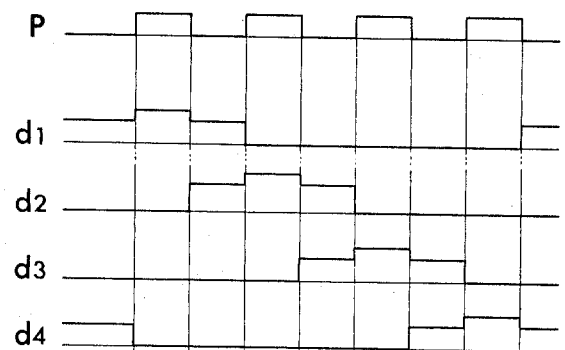
FIG. 8 illustrates a sequence of an exciting operation in accordance with a drive control system of the present invention.
Figure 9:
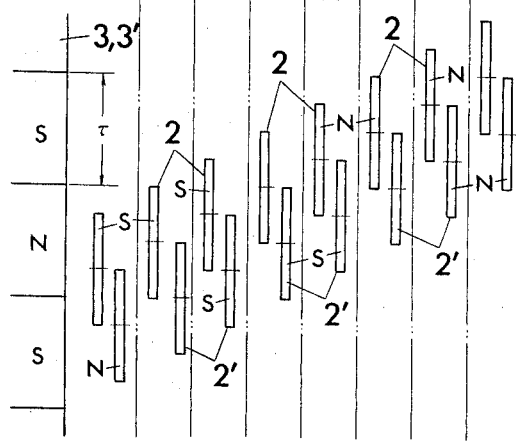
FIG. 9 is a diagrammatical view of relative positions of rotors is stopped under the respectively corresponding exciting conditions of FIG. 8.

The operation of the stepping motor rotated in accordance with the drive theory as illustrated above will be more easily understood by referring to the charts shown in FIGS. 8 and 9. In FIG. 8, $P$ is the input pulse, $d_1$ and $d_3$ are 1-phase and 3-phase exciting currents, respectively, for magnetizing the pole pieces 2 of the motor block $\alpha$ to N- and S-poles, respectively, and $d_2$ and $d_4$ are 2-phase and 4-phase exciting currents, respectively, for magnetizing the pole pieces $2'$ of the motor block $\beta$ to N- and S-poles, respectively. In FIG. 9, 3 and $3'$ are permanent magnets housed in the motor blocks $\alpha$, and $\beta$ respectively, and $\tau$ represents an pole pitch angle of the pole pieces attached to the permanent magnets. In summary then and as shown in FIGS. 8 and 9, and indicated above, the normal sequence, starting at the onset of the first (leftwardmost) pulse P, of excitation of the coils 1 and $1'$ is (1) the first phase-coil state, (2) the first phase-coil state and the second phase-coil state, (3) the second phase-coil state, (4) the second phase-coil state and the third phase-coil state, (5) the third phase-coil state, (6) the third phase-coil state and the fourth phase-coil state, (7) the fourth phase-coil state, and (8) the fourth phase-coil state and the first phase-coil state. Further, in the first phase-coil state a current $d_1$ flows in one direction through the coil 1 to magnetize the pole piece 2 to N-pole, in the second phase-coil state a current $d_2$ flows in one direction through the coil $1'$ to magnetize the pole piece $2'$ to N-pole, in the third phase-coil state a current $d_3$ flows in another direction through the coil 1 to magnetize the pole piece 2 to S-pole, and in the fourth phase-coil state a current $d_4$ flows in another direction through the coil $1'$ to magnetize the pole piece $2'$ to S-pole.

Figure 4:
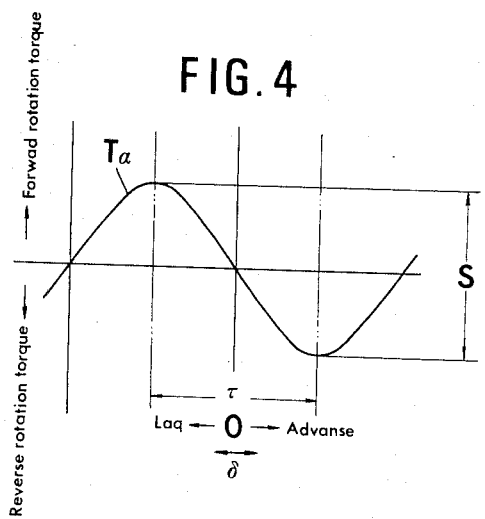
FIG. 4 shows a torque curve obtained when only one of exciting windings of the stepping motor shown in FIG. 1 is excited.
Figure 7:
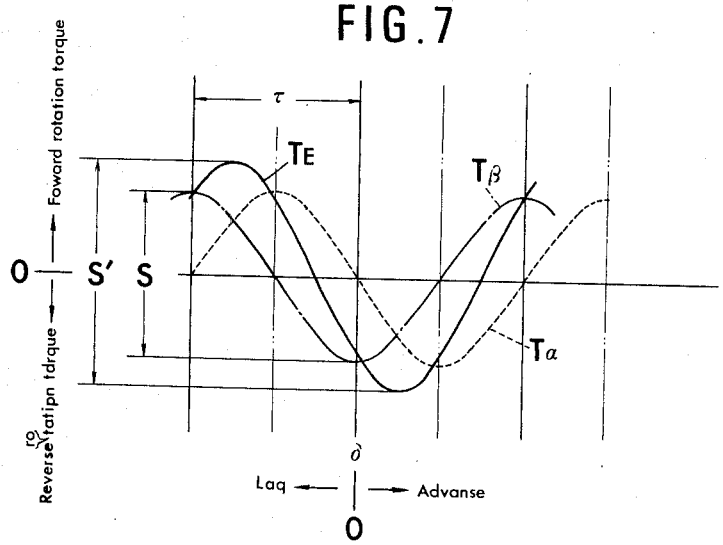
FIG. 7 shows a torque curve obtained by the system of FIG. 5.

As seen from the drawings, by the use of alternate 2-exciting state and 1-exciting state and by increasing the amount of the exciting current in the 1-exciting state to approximately $\sqrt{2}$ times of the amount of the exciting current per phase in the 2-exciting state, the amplitude S in FIG. 4, of the torque in the 1-exciting state is made equal to the amplitude $S'$ in FIG. 7, in the 2-exciting state to overcome the ununiformity of the torque characteristic inherent to the 2-excitation - 1-excitation system while providing a stepping angle of $\tau/4$ per input pulse.

When the reverse rotation command trigger pulse $P_2$ is applied to the input terminal CCW, the outputs of the gates $Gk_2$, $Gk_3$, $Gk_8$, $Gk_9$ and $Gl_2$, $Gl_3$, $Gl_8$, $Gl_9$ in the reversible binary flip-flop circuits K and L remain 0 irrespective of the state of the input pulse P, and the reversible binary flip-flop circuits K and L operate as reverse binary flip-flop circuits. Thus, the output sequence of the gates $Gk_1$, $Gk_4$ and $Gl_5$, $Gl_6$, $Gl_{11}$, $Gl_{12}$ due to the change of the input pulse P is quite inverse to that obtained when the forward rotation command trigger pulse $P_2$ is applied to the input terminal CW. Therefore, the sequence in which the stepping motor exciting coils A and B are excited in accordance with the exciting output gates $Gm_1$, $Gm_2$, $Gm_3$ and $Gm_4$ is reversed and the direction of the rotation of the stepping motor is reversed.

It is thus seen, according to the teaching of the present invention, that in driving of the twin stepping motor which is rotated by the attraction and repulsion actions between the permanent magnets and the pole pieces, a rotor step angle per input pulse can be reduced to one half of that obtainable in the prior art step motor drive system by employing alternate 2-exciting and 1-exciting state, and the ununiformity of the torque characteristic which is inherent to the 1-exciting and 2-exciting drive control system can be avoided by increasing the exciting current in the 1-exciting state to be larger than the exciting current per phase in the 2-exciting state. Thus, a 4-phase stepping motor operated in accordance with the present invention provides the same output power as that obtainable by an 8-phase stepping motor operated in a conventional manner. Nevertheless, the rotor inertia moment is the same as that of the 4-phase stepping motor. Accordingly, the drive control system of the present invention is particularly applicable to drive those stepping motors which require high quality of self-start frequency characteristic, anti-haunting characteristic, torque characteristic or the like, such as stepping motors for electronic computers.

What is claimed is:

1. A stepping motor apparatus comprising a 4-phase stepping motor having permanent magnets and pole pieces provided with stepping motor exciting coils arranged to enable selection among four different phase-coil states of excitation of said coils, said motor having means rotatable by attraction and repulsion actions between said permanent magnets and pole pieces, an improved drive control system including sequencing means for causing exciting of said exciting coil in the sequence of (1) a first phase-coil state, (2) the first phase-coil state and a second phase-coil state, (3) the second phase-coil state, (4) the second phase-coil state and a third phase-coil state, (5) the third phase-coil state, (6) the third phase-coil state and a fourth phase-coil state, (7) the fourth phase-coil state, and (8) the fourth phase-coil state and the first phase-coil state, wherein the first and third phase-coil states correspond to energization to exciting coils different from the exciting coils energized in the second and fourth phase-coil states, current multiplying means responsive to said sequencing means for causing the amount of current flowing through the stepping motor exciting coils during steps (1), (3), (5) and (7) to be increased to approximately $\sqrt{2}$ times of the amount of the normal current flowing through one of the exciting coils during steps (2), (4), (6), and (8).

2. The apparatus of claim 4 in which said permanent magnets comprise poles of a rotor and alternate in magnetic polarity circumferentially of the rotor, said drive control system including an input for a train of motor stepping pulses, said sequencing means including means responsive to each amplitude change in the stepping pulse waveform for then initiating the next step in said sequence (1) through (8), each step of said sequence (1) through (8) corresponding to angular advancement of said rotor by one quarter the angular width of one of said permanent magnet poles, each said step corresponding to a discrete rotative stopping position of said stepping motor whereby to double the number of possible motor angular stopping positions per rotor revolution.

3. The apparatus of claim 1 in which said stepping motor comprises first and second units each having a set of said permanent magnets, an opposed set of said pole pieces and a corresponding exciting coil, said sequencing means including first and second reversible binary flip-flops each having at least four outputs, said second flip-flop being responsive to first outputs of said first flip-flop, and a pulse input connected to said first flip-flop for sequencing said flip-flops through logic steps.

4. The apparatus of claim 3 in which said sequencing means further includes command circuit means connected to said first and second flip-flops for selecting inverted or noninverted sequencing of said flip-flops, corresponding to opposite directions of rotation of said stepping motor, and a plurality of output gates each connected to ones of said outputs of said flip-flops for energization thereby and each corresponding to a different pole piece polarization of a given unit, said current multiplying means including means responsive to outputs of said flip-flops corresponding to sole energization of any one of said output gates for providing said increased current and being responsive to contemporaneous energization of more than one of said output gates for providing said normal current, said sequencing means further including exciting coil energizing means for each exciting coil responsive to said output gates for flowing said current from said current multiplying means to the corresponding exciting coil in a direction determined by said output gates.

5. The apparatus of claim 1 in which said sequencing means includes first and second binary flip-flop circuits, each said binary flip-flop circuit comprising first and second flip-flops, a stepping pulse source, a motor forward command line and a motor reverse command line;

said first binary flip-flop circuit including a group of forward gates each having a first input from said forward command line and a group of reverse gates each having a first input from said reverse command line, said gates each having a second input connected to said stepping pulse source, the stepping pulse source connection to one said group being through inverting means, said gates each having a third input from a corresponding one of said first and second flip-flops and an output to the other of said first and second flip-flops.

6. The apparatus of claim 5 in which said second binary flip-flop circuit is similar to said first binary flip-flop circuit except that said second inputs to the forward and reverse gates of said second binary flip-flop circuit connect to corresponding outputs of said first flip-flop of said first binary flip-flop circuit, rather than to said stepping pulse source, and comprise the interconnection of said first and second binary flip-flop circuits.

7. The apparatus of claim 5 in which said stepping motor has a first and second exciting coils, said sequencing means further including first and second power amplifier circuits for respectively energizing said first and second exciting coils forwardly or reversely, first and second output gates respectively controlling forward and reverse operation of said first power amplifier and third and fourth output gates respectively controlling forward and reverse operation of said second power amplifier, said first and second output gates both receiving inputs from one forward gate and one reverse gate of said first binary flip-flop circuit and respectively receiving complimental outputs from the second flip-flop of said second binary flip-flop circuit, said third and fourth output gates each receiving inputs from another forward gate and another reverse gate of said first binary flip-flop circuit and respectively receiving complimental outputs from the first flip-flop of said second binary flip-flop circuit, the outputs of said first through fourth output gates corresponding to selection of respective first through fourth ones of said four different phase-coil states.

8. The apparatus of claim 1 in which said sequencing means includes first and second binary flip-flop circuits, said first binary flip-flop circuit comprising first and second flip-flops and gate means interconnecting the outputs of each of said first and second flip-flops to corresponding inputs of the other of said first and second flip-flops, an input stepping pulse source, said interconnecting gate means being responsive to the state of said stepping pulse source to invert flip-flop outputs therethrough for causing said flip-flops to change state alternately and at one half the frequency of said stepping pulse input, said second binary flip-flop circuit being substantially similar to said first binary flip-flop circuit and comprising third and fourth flip-flops and corresponding interconnecting gate means, said interconnecting gate means including forward gates and reverse gates, said sequencing means further including a rotation command flip-flop responsive to forward rotation and reverse rotation command trigger pulses on respective inputs thereof for alternatively energizing and maintaining energized corresponding inputs of said forward and reverse gates, respectively.

9. Drive control apparatus for a stepping motor comprising first and second units each having a set of permanent magnets and an opposed set of pole pieces having an exciting coil, wherein motor rotation is accomplished by attraction and repulsion between the magnets and pole pieces, comprising:

first and second reversible flip-flops each having a plurality of outputs, said second flip-flop being responsive to ones of said outputs of said first flip-flop;

a stepping pulse input connected to said first flip-flop for sequencing said flip-flops through logic steps corresponding to stepping of said motor;

command circuit means connected to said first and second flip-flops for selecting inverted or noninverted sequencing of said flip-flops, corresponding to opposite directions of rotation of said stepping motor;

means defining a plurality of output gates each connected to and actuable by ones of said outputs of said flip-flops for selecting sole or multiple energization of said coils and each corresponding to a different coil and coil current flow direction;

current multiplying means responsive to outputs of said flip-flops corresponding to sole energization of any one of said exciting coils for providing an increased current output and alternatively responsive to outputs of said flip-flops corresponding to simultaneous energization of more than one of said exciting coils for providing a reduced current output;

exciting coil energizing means for each exciting coil and responsive to corresponding ones of said output gates for applying said current output of said current multiplying means to the corresponding exciting coil in a direction determined by said corresponding output gates;

whereby to sequence said stepping motor through a series of states including sole coil energization states and multiple coil energization states, with increased coil current in said sole coil energization states.

10. The apparatus of claim 9, in which first, second, third and fourth outputs of said first flip-flop are responsive to setting of said command circuit means to forward and reverse rotation of said stepping motor and including means connecting said first, second, third and fourth outputs to said current multiplying means, said plurality of output gates comprising a pair of output gates for each of said first and second units, the output gate pair corresponding to said first unit being connected to both of said first and second outputs of said first flip-flop and the output gate pair corresponding to said second unit being connected to both of said third and fourth outputs of said first flip-flop.

11. The apparatus of claim 10 in which said output gates associated with said first unit each have a separate further input from said second flip-flop and said output gates associated with said second unit each have a further and differing input from said second flip-flop, said exciting coil energizing means for each exciting coil comprising first swtich means for flowing current through said coil in one direction and second switch means for flowing current through said coil in the opposite direction, said first switch means being controlled by one of said output gates and the second switch means being controlled by the other of said output gates for the corresponding unit.

* * * * *

UNITED STATES PATENT OFFICE
CERTIFICATE OF CORRECTION

Patent No. 3 800 206               Dated March 26, 1974

Inventor(s) Matatoyo Hinachi and Toyoshi Mori

It is certified that error appears in the above-identified patent and that said Letters Patent are hereby corrected as shown below:

Col. 8, line 53; change "coil" to ---coils---.

Col. 9, line 3; change "Claim 4" to ---Claim 1---.

Col. 10, line 11; change "has a" to ---has---.

Signed and sealed this 3rd day of September 1974.

(SEAL)
Attest:

McCOY M. GIBSON, JR.          C. MARSHALL DANN
Attesting Officer             Commissioner of Patents